United States Patent Office 2,744,130
Patented May 1, 1956

2,744,130

QUATERNARY AMMONIUM MONOMERS AND POLYMERS THEREOF

Hilmer Ernest Winberg, Wilmington, Del., assignor to E. I. du Pont de Nemours and Company, Wilmington, Del., a corporation of Delaware No Drawing. Application April 11, 1952,
Serial No. 281,901

2 Claims. (Cl. 260—482)

This invention relates to new vinylidene compounds containing quaternary ammonium groups and which further have a carboxylic group.

The use of nitrogen-containing monomers in polymerization and copolymerization has resulted in the preparation of polymers whose physical and chemical properties are susceptible to further modification. Such further modification is of considerable importance as a method of increasing dyeability of certain relatively inert polymers of ethylenically unsaturated compounds. Monomers polymerizable either alone or with other ethylenically unsaturated compounds to give polymers having good stability under acidic and alkaline conditions and also good dyeability are desirable. Thus, a polymer having the inertness of polyacrylonitrile but dyeable under conditions of substantial neutrality (with respect to acidity) would be of considerable economic importance in the textile industry. Various not entirely satisfactory attempts to solve this problem have been made. Thus, acrylonitrile polymers have been rendered dyeable by the introduction into the polymer of quaternary ammonium vinylidene units. However, the copolymers having simple quaternary ammonium units exhibit a lack of thermal stability, particularly after soaping or other alkaline boil-offs. This defect is serious where the copolymer is intended for textile or similar uses since the alkaline environment of washing conditions the polymer for thermal instability and subsequent ironing deteriorates the polymer.

This invention has as an object the provision of new chemical compounds. A further object is the preparation of new monomeric intermediates for polymers and particularly for acrylonitrile copolymers of improved dyeability and thermal stability after alkaline treatment. Another object is the polymers, especially copolymers. Other objects will appear hereinafter.

These objects are accomplished by the new monomers of the present invention, i. e., quaternary ammonium salts, the anion of which is that of an acid of molecular weight up to, i. e., not more than 250, containing in the cation but one non-aromatic carbon to carbon double bond and that in a vinylidene, $CH_2=C<$, group attached to one valence of the quaternary nitrogen by a carbon-containing chain and, attached to another valence of the quaternary nitrogen through a wholly carbon chain, a single carboxyl group and the polymers, including copolymers, of said monomers.

The monomers of this invention can be prepared by the reaction of a tertiary amine which contains a single vinylidene group with an alkyl ester of a monochloro- or monobromoalkanoic acid or a lactone. They can also be prepared by the reaction of an alkyl halide, sulfate, or an arylsulfonate with a tertiary amine containing a vinylidene group and a carbalkoxy group.

The following examples in which parts are by weight are illustrative of the invention.

EXAMPLE I

*Beta-vinyloxyethylcarboethoxymethyldimethylammonium chloride*

A mixture of 11.5 parts of beta-vinyloxyethyldimethylamine and 12.3 parts of ethyl chloroacetate dissolved in 88 parts of anhydrous benzene was permitted to stand at room temperature for four days. The white hydroscopic needles melting at 85–88° C. were isolated by filtration in a dry nitrogen atmosphere. Beta-vinyloxyethylcarboethoxymethyldimethylammonium chloride crystallized from methyl ethyl ketone in the form of needles.

Analysis.—Calculated for $C_{10}H_{20}NO_3Cl$: C, 50.52%; H, 8.48%; N, 5.89%. Found: C, 50.34%; H, 8.56%; N, 5.83%, 5.69%.

EXAMPLE II

*Beta-vinyloxyethylcarbo-t-butoxymethyldimethylammonium chloride*

A solution comprising 11.5 parts of beta-vinyloxyethyldimethylamine in 22 parts of anhydrous benzene was added to a solution of 15.06 parts of t-butyl chloroacetate in 22 parts of reagent benzene. After flushing with nitrogen, the sealed reaction vessel was permitted to stand at room temperature for one week. The crystalline beta-vinyloxyethylcarbo-t-butoxymethyldimethylammonium chloride was washed with anhydrous benzene followed by anhydrous ether and dried. It was soluble in water and absolute ethanol but insoluble in hot methyl ethyl ketone, acetone, ethyl acetate, or dioxane.

Analysis.—Calculated for $C_{12}H_{24}NO_3Cl$: C, 54.23%; H, 9.10%; N, 5.27%. Found: C, 54.71%; H, 9.39%; N, 5.36%, 5.63%.

EXAMPLE III

*Beta-methacryloxyethylcarbomethoxymethyldimethylammonium chloride*

A mixture of eight parts of beta-dimethylaminoethyl methacrylate, 13 parts of methyl chloroacetate, and 16.8 parts of acetone was allowed to stand at room temperature overnight. Filtration of the resulting solid followed by washing with ether gave 12.1 parts of beta-methacryloxyethylcarbomethoxymethyldimethylammonium chloride, M. P. 138–139° C.

Analysis.—Calculated for $C_{11}H_{20}NO_4Cl$: N, 5.28%. Found: N, 5.16%, 5.22%

EXAMPLE IV

*Beta-methacryloxyethyl beta-dimethylaminopropionate betaine*

To a mixture of 15.7 parts of beta-dimethylaminoethylmethacrylate in ten parts of methyl ethyl ketone was added portionwise with stirring and cooling in an ice/methanol bath, a mixture of 7.2 parts of beta-propiolactone and 10 parts of methyl ethyl ketone. The mixture was kept at 0° C. overnight. Filtration afforded 16 parts of the betaine, a white hygroscopic solid, M. P. 102–105° C.

Analysis.—Calculated for $C_{11}H_{19}NO_4$: N, 6.12%. Found: N, 6.00%, 5.74%.

EXAMPLE V

*Beta-vinyloxyethyl beta-dimethylaminopropionate betaine*

To a solution of 34.55 parts of beta-vinyloxyethyldimethylamine in 79 parts of reagent acetone contained in a flask provided with a sealed stirrer, dropping funnel, thermometer and calcium chloride drying tube was added over a period of 1.5 hours a solution of 21.62 parts of freshly distilled beta-propiolactone in 20 parts of reagent acetone. The temperature was maintained at —14° C. during the addition. Stirring was continued for 2.5 hours at a temperature of 0° C., after which time the white solid was isolated by filtration in a nitrogen atmosphere and dried under high vacuum at room temperature.

EXAMPLE VI

*Beta-vinyloxyethyl dimethylaminoacetate betaine*

A solution of 18.90 parts of chloroacetic acid in 200 parts of distilled water was titrated to pH 7 with 4.06 N sodium hydroxide using a glass electrode. This solution was quantitatively transferred to a volumetric flask, 22.885 parts of beta-vinyloxyethyldimethylamine added and the resulting solution diluted with water to an aqueous solution corresponding to 500 parts of water by volume. Test for chloride ion was positive within a few minutes after mixing the solution. Quaternization was followed by titration for ionic chlorine, and it was found that after two weeks the solution contained 13.45 parts of ionic chlorine per 1000 parts of solution compared with the calculated value of 14.11 parts. No free amine could be detected by potentiometric titration. Copolymers prepared from 95 parts of acrylonitrile and sufficient of this aqueous solution to contain 5 parts of the quaternary ammonium monomer gave polymers which readily accept acid dyes independent of pH.

EXAMPLE VII

*Beta - vinyloxyethyl(p - hydroxy - m - carbomethoxy - benzyl)dimethylammonium chloride*

A solution of 1.15 parts of beta-vinyloxyethyldimethylamine in seven parts of anhydrous ether was mixed with a solution of 2 parts of methyl 3-chloromethyl-6-hydroxybenzoate in seven parts of anhydrous ether. The mixture was maintained at ice bath temperature for four hours, after which time the product was isolated by filtration in a dry nitrogen atmosphere. There was obtained 2.58 parts of hygroscopic solid soluble in water and absolute alcohol, but insoluble in hot ethyl acetate, acetone, or methyl ethyl ketone.

*Analysis.*—Calculated for $C_{15}H_{22}NO_4Cl$: Cl, 11.23%. Found: Cl, 11.41%, 11.41%.

EXAMPLE VIII

*Quaternary from 4-vinylpyridine and chloroacetic acid*

To a solution of 9.5 parts of 4-vinylpyridine dissolved in benzene was added 12.6 parts of chloroacetic acid. The solution warmed spontaneously and an orange oil separated and solidified. The solid was filtered and washed with a small amount of acetone. There was obtained 6 parts of the quaternary.

When the above general procedure was substantially repeated except that the orange oil was dissolved in water and excess fresh silver oxide added to remove the halogen anion, the betaine was formed.

The present invention is generic to quaternary ammonium salts of acids of molecular weight of up to 250 in the cation of which salt there is a single non-aromatic carbon to carbon unsaturation and that in a vinylidene, $CH_2=C<$, group linked to one valence of the quaternary nitrogen by a carbon-containing chain, the cation also containing a single carboxylic group linked to another valence of the nitrogen by a carbon-containing chain of at least one atom, with all chain atoms carbon. In a preferred embodiment the remaining valences of the quaternary nitrogen are attached to hydrocarbon radicals, preferably of 1 to 4 carbon alkyls.

The term "carboxylic" is used as in Classification Bulletins 75 and 173 to denote a —COO— group, thus including the COOH group and salts and esters thereof. Since the compounds contain but a single carboxylic group the anhydride, COOOC, group is excluded. In the case of ester groups COOR the alcohol, R, portion is preferably alkyl of one to four carbons.

A particular desirable class of compounds is that of compounds of the formula

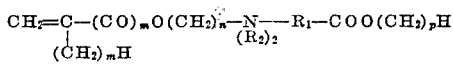

wherein $m$ is a cardinal number not greater than, i. e., up to, one, $n$ is a plural interger not greater than 3, $p$ is a cardinal number not greater than 4, $R_2$ is an alkyl radical of one to four carbons, $R_1$ is a divalent saturated aliphatic hydrocarbon radical of one to three carbons, X is an anion of an acid of molecular weight up to 250. This class is also conveniently described as that of tetraalkylammonium salts, one alkyl group of which is substituted by a single vinylidene $(CO)_mO$ group wherein $m$ is a cardinal number not greater than one and another alkyl group has a single carboxylic substituent, the anion being that of an acid of molecular weight up to 250.

In the compounds of this invention the anion is, for reasons of ready polymerizability of the salts, that of an acid of molecular weight up to 250. Generally the anion is halide ion, e. g., chloride; sulfate or sulfonate, e. g., methylsulfate or p-toluenesulfonate or one from one of the substituents on the nitrogen thus forming therewith a betaine. By one or other of the methods previously given there may be prepared the compounds of this invention including N-beta-methacrylyloxyethyl-N-beta - carbomethoxyethyl - N - dimethylammonium chloride, N - carbomethoxyethyl - 2 - vinylpyridinium chloride, N - gamma - methacrylyloxypropyl - N - beta - carbomethoxymethyl - N - dimethylammonium chloride and N - gamma - vinyloxypropyl - N - beta - carboeth - oxyethyl - N - dimethylammonium bromide.

The monomers of this invention may be polymerized to useful polymeric materials, and particularly copolymers. Particularly valuable because of their properties are the copolymers with acrylonitrile wherein the latter is present in predominant amount. Thus copolymers containing 1–20% of the quaternary ammonium units of the present invention and at least 80% of acrylonitrile units are markedly improved in dyeability over the acrylonitrile homopolymer but without undue sacrifice of the outstanding properties of acrylonitrile polymers. Copolymers containing 2–10% of the quaternary ammonium monomer units of this invention with at least 80% and preferably at least 85% of acrylonitrile units are, because of the superior combination of dyeability, strength resistance to solvents, and stability to conventional textile treating agents, particularly preferred. The polymers of this invention have superior thermal stability after exposure to alkaline conditions as compared with polymers from quaternaries not having carboxyl or carbalkoxy groups. This property is of particular advantage in connection with copolymers of the quaternary ammonium compounds of this invention with other vinylidene monomers whose polymers generally are deficient in dye receptivity. This is described in greater detail in copending applications Serial Nos. 216,838 and 216,839, now Patent Number 2,677,679 filed March 21, 1951, by Arthur L. Barney. The compositions of this invention may also be used as in the preparation of photographic film and paper, as chemical intermediates, e. g., for reaction at the active carbon-carbon double bond with addends such as mercaptans, amines, halogens and alcohols. They are also of use as surface active agents and polymers therefrom are also of use in the surfactant field. Furthermore, the compounds of this invention can be employed in monomeric or polymeric form in the formulation of bactericidal compositions and as antistatic agents for textiles.

The polymers of this invention are obtained by bringing the monomer, or mixture of monomers, in contact with a polymerization catalyst. Polymers, and particularly copolymers, are generally obtained by the use of catalytic amounts of a free-radical producing material, e. g., a peroxy, or azo catalyst. Ionic catalysts are useful, particularly for homopolymerization of the vinyloxy compounds of this invention. The polymers and copolymers which have a molecular weight of at least 5,000, e. g., 5,000 to 100,000 are preferred in view of their utility in plastic and fiber application.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A quaternary ammonium salt of an acid of molecular weight up to 250 wherein the four radicals attached in the cation to nitrogen are (a) two alkyl radicals of one to four carbons, (b) a methacrylyloxyalkyl radical wherein the alkyl is of two to three carbons, (c) an alkyl radical of one to three carbons having a substituent of the class consisting of the carboxyl group and esters thereof with alkanols of one to four carbons.

2. Beta - methacryloxyethylcarbomethoxymethyldimethylammonium chloride.

References Cited in the file of this patent

UNITED STATES PATENTS

| | | |
|---|---|---|
| 2,572,560 | Ham | Oct. 23, 1951 |
| 2,572,561 | Ham | Oct. 23, 1951 |
| 2,609,392 | Crossley | Sept. 2, 1952 |
| 2,626,877 | Carnes | Jan. 27, 1953 |
| 2,631,995 | Bruson | Mar. 17, 1953 |
| 2,649,438 | Bruson | Aug. 18, 1953 |